United States Patent [19]
Suzuki et al.

[11] Patent Number: 6,118,552
[45] Date of Patent: Sep. 12, 2000

[54] IMAGE SIGNAL ENCODING APPARATUS

[75] Inventors: Kazuhiro Suzuki; Toshiaki Yoshinari; Taro Yokose; Ken Umezawa, all of Kanagawa, Japan

[73] Assignee: Fuji Xerox Co., Ltd., Tokyo, Japan

[21] Appl. No.: 08/693,382

[22] Filed: Aug. 6, 1996

Related U.S. Application Data

[62] Division of application No. 08/309,108, Sep. 20, 1994, abandoned.

[30] Foreign Application Priority Data

Sep. 21, 1993 [JP] Japan ..................................... 5-234915

[51] Int. Cl.[7] ............................. H04N 1/415; H04N 1/46
[52] U.S. Cl. ......................... 358/432; 358/426; 358/467; 358/539; 382/232; 382/166
[58] Field of Search .................................... 358/426, 429, 358/432, 433, 443, 448, 462, 464, 465, 467, 530, 539; 382/232, 239, 243, 162, 166

[56] References Cited

U.S. PATENT DOCUMENTS

| | | | |
|---|---|---|---|
| 4,922,349 | 5/1990 | Abe et al. | 358/443 |
| 4,975,768 | 12/1990 | Takaraga | 358/464 |
| 5,383,037 | 1/1995 | Kimura et al. | 358/433 |

FOREIGN PATENT DOCUMENTS 3-104380  5/1991  Japan .

*Primary Examiner*—Thomas D. Lee
*Attorney, Agent, or Firm*—Finnegan, Henderson, Farabow, Garrett & Dunner, L.L.P.

[57] ABSTRACT

An image signal encoding apparatus reads an image from an original and converts the image into color data values including lightness and chromaticity components. The data values are stored and divided into pixel blocks with data values of lightness components and pixel blocks with data values of chromaticity components. Average lightness component data values are computed for pixel blocks of lightness components and average chromaticity data values are computed for pixel blocks of chromaticity components. A region determination is made whether the pixel blocks correspond to color, monochrome or background region in the original based on the average pixel block data values of lightness components and chromaticity components. A switch outputs the lightness pixel block data values during the region determination, and outputs the lightness and chromaticity pixel block data values after the region determination. The lightness pixel block data values are adaptively bi-level connected based on the result of the region determination. A bi-level image encoder encodes lightness pixel block data values converted by adaptive bi-level conversion and the result of the region determination is stored as region information. A color image encoder encodes the chromaticity pixel block data values consisting of man pixels determined to correspond to the color region based on the stored region information after the region determination process on the whole original is completed and a transmitter transmits at least one of the set of data values encoded by the bi-level image encoder and the set of data values encoded by the color image encoder.

16 Claims, 11 Drawing Sheets

FIG. 6a ALL WHITE/ALL BLACK

FIG. 6b SIMPLE BI-LEVEL CONVERSION

FIG. 6c ALL WHITE

FIG. 9a ALL WHITE/ALL BLACK

TEXT — SIMPLE BI-LEVEL CONVERSION
```
00000110
00001100
00011000
00011000
00110000
01100000
11000000
00000000
```

PHOTOGRAPHIC IMAGE — ERROR DIFFUSION
```
00101101
01101000
10010010
01001000
00010100
01101010
10101000
00000000
```

FIG. 9c ALL WHITE
```
00000000
00000000
00000000
00000000
00000000
00000000
00000000
00000000
```

IMAGE SIGNAL ENCODING APPARATUS

This is a division of application Ser. No. 08/309,108, filed Sep. 20, 1994 now abandoned.

BACKGROUND OF THE INVENTION

1. Field of the Invention

The present invention relates to an encoding apparatus which encodes an image from an original document and in particular relates to an apparatus for efficiently encoding an image from an original document including a combination of monochrome and color regions.

2. Discussion of the Related Art

Conventionally, most documents used in offices have been monochrome (black-and-white) prints. However, color documents used in offices have gradually increased in number with the recent spread of full-color copying machines and printers of high image quality.

To efficiently transmit such documents to another location and store them, a method of compression is important. With respect to an original including a bi-level image, compression methods such as Modified Huffman (MH), Modified READ (MR), Modified MR (MMR) and the Joint Bi-level Image Expert Group (JBIG) system using a hierarchical encoding function are known and have already been adapted to a facsimile machine.

For compressing a color image, the Joint Photographic Expert Group (JPEG) system has been accepted as a standard by the International Organization for Standardization (ISO) and Telecommunication Standardization Sector (TSS, former CCITT).

However, the application of these systems is limited to specific types of original. For example, the encoding system for a facsimile machine cannot be applied to a color image. Even if applied as a bit-plane encoding, sufficient encoding efficiency cannot be obtained because it is a reversible encoding system. When the JPEG system, the standard system for color image encoding, is applied to encode and compress an image on an original, the encoding efficiency is reduced with respect to bi-level image regions such as character regions where many high frequency components are generated around the edge portions in the image, and moreover, as the compression rate increases, deterioration tends to occur around the edges.

When the original is either a wholly color original or a wholly monochrome original, the single system which is most suitable can be applied to the type of the original. However, in the case of encoding an original including a combination of monochrome image regions and color image regions, conventional systems used for facsimile machines have to encode the color image regions by, for example, halftoning. When a color image encoding system is applied to the whole original including the combination of color and monochrome regions, even the monochrome image regions are represented by 24 bits per pixel though they can be adequately represented by 1 bit per pixel, thus making the representation highly redundant.

Consequently, in encoding an original including a combination of monochrome image regions and color image regions, it is preferable to separate the monochrome regions and color regions from each other, and apply a suitable system for encoding and transmission to each image region.

The character separating and encoding method disclosed by Japanese Patent Application Unexamined Publication No. Hei. 3-104380 (1991) has been proposed for efficient transmission of an image including a combination of color image regions and monochrome image regions.

The construction of the conventional method disclosed in the above publication is now described based on FIG. 13.

In the FIGURE, 1 is an image input component for inputting images, 2 is an image storing component for storing input images, 7 is an image display component for displaying the image stored in the image storing component 2, 8 is a region specifying component for specifying a color image region based on the image displayed on the image display component 7, 3 is a region separation component for separating image information from the image stored in the image storing component 2 based on region information indicated by the region specifying component 8, 4 is a color image encoding component for encoding an image separated as a color image region, 5 is a bi-level image encoding component for encoding an image separated as monochrome image region, and 6 is a transmission control component for controlling the transmission of the respective image information encoded by the color image encoding component 4 and bi-level image encoding component 5.

The following description covers the operation of the above conventional method.

An image signal input by the image input component 1 is temporarily stored in the image storing component 2. The image information stored in the image storing component 2 is presented to the user by the image display component 7.

Based on the displayed image, the user inputs region information which distinguishes the monochrome image region and color image region, using the region specifying component 8. The region separation component 3 separates the image information stored in the image storing component 2 based on the region information provided by the region specifying component 8.

Separated color image information is encoded by the color image encoding component 4 and monochrome image information is encoded by the bi-level image encoding component 5. Coded data for the color image region and monochrome image region having been separately encoded is transmitted with information indicating the regions from the transmission control component 6.

With this construction and operation, the method disclosed by the above Japanese Patent Application Unexamined Publication No. Hei. 3-104380 (1991) can divide an image on an original into a monochrome image region and a color image region, encode each region with a suitable method and transmit them, thus improving image quality and the original image compression ratio compared to the case where the whole original is encoded by a single encoding method.

In the above conventional system, the following methods of automatically identifying the color image region are described:

(1) a method of identifying the color image region by the frequency of density variation and density distribution in a partial region such as a group of 4×4 pixels;

(2) a method which checks the density distribution deviation for each color and determines achromatic or monochrome regions with sudden density changes as identifying text;

(3) a method of identification utilizing the difference in typical pixel sequence between a halftone image and line image such as text. However, the algorithm is not clearly described, and moreover, correction of determination errors must be carried out by a manual operation.

Furthermore, a memory for storing all image data having been input for the purpose of region separation process is necessary for the example of the conventional method. For example, if a full-color image of A4 paper size is input with a resolution of 400 dpi, the data amounts to about 48 megabytes, increasing the cost of the apparatus.

SUMMARY OF THE INVENTION

The present invention has been made in view of the above circumstances and has as an object the provision of an apparatus for encoding an image including a combination of color regions and monochrome regions which can easily separate the color regions from the image with a minimum of computation and which does not require a manual correction.

A further object of the present invention is to provide an apparatus for encoding an image including a combination of color regions and monochrome regions, wherein the amount of memory for temporarily storing image data is reduced.

Additional objects and advantages of the invention will be set forth in part in the description which follows and in part will be obvious from the description, or may be learned by practice of the invention. The objects and advantages of the instrumentalities and combinations particularly pointed out in the appended claims.

To achieve the objects and in accordance with the purpose of the invention, as embodied and broadly described herein, the image signal encoding apparatus of this invention comprises image inputting means for reading an image from an original and converting the image into data values comprising a plurality of color components including lightness and chromaticity components and outputting the data values, storing means for storing each of the data values, dividing means for dividing the data values into data values of a rectangular pixel block of lightness component consisting of m×n pixels and data values of rectangular pixel blocks of chromaticity components consisting of m×n pixels, average data value calculating means for calculating an average lightness component data value of m×n pixels in the pixel block of lightness component and average chromaticity data values of m×n pixels in the pixel blocks of chromaticity components, region determination means for determining whether the rectangular pixel blocks correspond to a color, monochrome or background region in the original based on the average data values of m×n pixels of the pixel blocks of lightness component and chromaticity components and outputting a result of region determination, switching means for outputting the data values of the pixel block of lightness component during the region determination process by the region determination means, and for outputting the data values of the pixel blocks of lightness component and chromaticity components after the region determination process is completed, bi-level converting means or performing adaptive bi-level conversion of the data values of the pixel block of lightness component based on the result of the region determination, bi-level image encoding means for encoding data values of the pixel block of lightness component converted by adaptive bi-level conversion, region storing means for storing the result of the region determination as region information, color image encoding means for encoding the data values of the rectangular pixel blocks of chromaticity components consisting of m×n pixels determined to correspond to the color region by the region determination means based on the region information stored in the region storing means after the region determination process on the whole original is completed, and transmission control means for transmitting at least one of the data values encoded by the bi-level image encoding means and the data values encoded by the color image encoding means.

The image input means reads an image from an original and converts it to a set of image signal values in some multidimensional color space, consisting of, for example of lightness and chromaticity components or luminance plus chrominance components, and then the storing means stores them. The image signals in the color space are divided into pixel blocks of lightness component and chromaticity components or luminance plus chrominance components which are rectangular regions of m×n pixels by a division means, wherein m and n are positive integers.

Next the average data value calculation means calculates the average data value over the pixel block for each parameter in the color space, and a region determination means compares it with a predetermined background value. If both of the differences between the average data value of lightness component of the region and the predetermined background value, and between the average data values of chromaticity components and the predetermined background value are not more than a predetermined threshold level, or both of the differences between the average data value of luminance component of the region and the predetermined background value, and between the average data values of chrominance components and the predetermined background value are not more than the predetermined threshold level, the pixel block is determined to be a background portion of the image.

If the differences between the average data values of chromaticity components of the region and the predetermined background value, or the differences between the average data values of chrominance components of the region and the predetermined background value are not more than a predetermined threshold level, and the difference between the average data value of lightness component of the the region and the predetermined background value or the difference between the average data value of the luminance component of the region and the predetermined background value is more than a predetermined threshold level, the pixel block is determined to be a monochrome region. When a pixel block is neither background nor monochrome region, it is determined to be a color region.

In parallel with region determination, the switching means outputs only the block of lightness or luminance component to a bi-level converter. Based on the region determination result, the bi-level converter converts blocks corresponding to the background regions into bi-level blocks of all-white or all-black, blocks of lightness or luminance component of the monochrome regions into bi-level values, and blocks corresponding to the color regions into all-white blocks, and then the bi-level image encoding means encodes them.

The region determination means described above determines the position of the color image regions by calculating the projection profile of the blocks which have been determined to correspond to a color region and the region storing means stores the result.

After the region determination process of the whole original is completed, the above-described switching means reads out the block values of lightness, chromaticity or luminance and chrominance components corresponding to the region stored in the region storing means from the image storing means, and then the color image encoding means encodes them. The transmission control means transmits the information which has been encoded by bi-level conversion, the information converted into color image code, and the region information.

In this way, combined color images and monochrome images included in an original are separated from each other and an encoding method appropriate to each of them is applied, thus improving the image quality and the compression ratio. Moreover, by analyzing the waveform of the seperated pixel blocks and obtaining a distinction between text and photographic images, the image quality of reproduced originals including not only text but also photographic images in the monochrome region blocks can also be improved.

Furthermore, since the storing means has an internal encoding means, the amount of memory required for the storing means can be reduced. The code data generated by the internal encoding means has information about the average data value per block unit, which can be used for the region determination described above by separating the information about the average data value per block unit. The code data also includes encoding mode information which is a result of the waveform analysis process in internal encoding, and therefore bi-level conversion based on the difference between text and photographic images in the monochrome region can be applied by separating the encoding mode information.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

FIGS. 6(a) through 6(c) show the bi-level conversion process for different regions;

FIGS. 9(a) through 9(c) show the bi-level conversion process for each region in the second embodiment;

DETAILED DESCRIPTION OF THE PREFERRED EMBODIMENTS

Preferred embodiments of an image signal encoding apparatus according to the present invention are now described in detail based on the drawings.

Figure 3A:
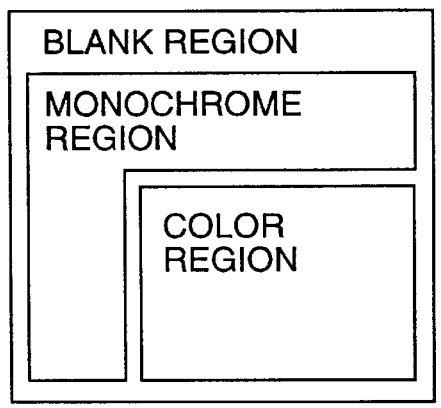
FIGS. 3(a) through 3(c) show region separation of color image region and monochrome image region in an original.
Figure 3B:
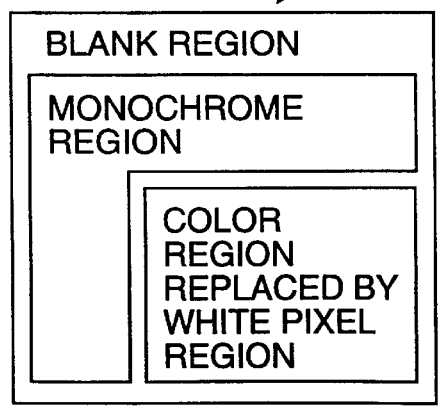

The principles of operation the present invention are first described. Based on FIG. 2, the encoding process of the present invention will be explained, wherein the encoding process of an image on an original including a combination of color images and monochrome images is broadly divided into the following two steps:

step 1: processes of region determination and bi-level encoding of the image on an original step 2: determination of the color region and encoding thereof The original including a combination of the color images and the monochrome images is shown in FIG. 3(a). In step 1, the color region in the original is detected, and the whole original is subject to the bi-level conversion process and then encoded as shown in FIG. 3(b). At this point, the color region is replaced by white pixels and encoded.

Figure 3C:
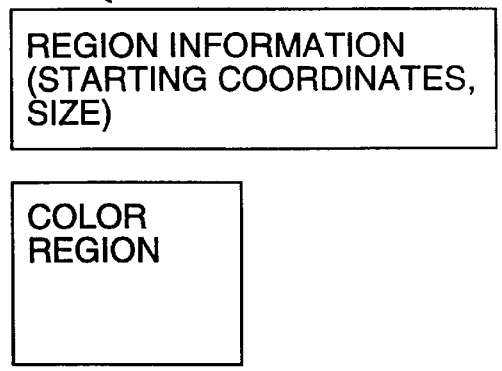

In step 2, an encoding method for a color image is applied to the portion detected as the color region which is shown in FIG. 3(c). Information indicating the color region in the original and the size thereof is assigned to the code.

When the decoding process is carried out, the bi-level images in the whole original are decoded first and the color region is decoded next, and then they are combined at the position designated by the region information.

First Embodiment

Figure 1:
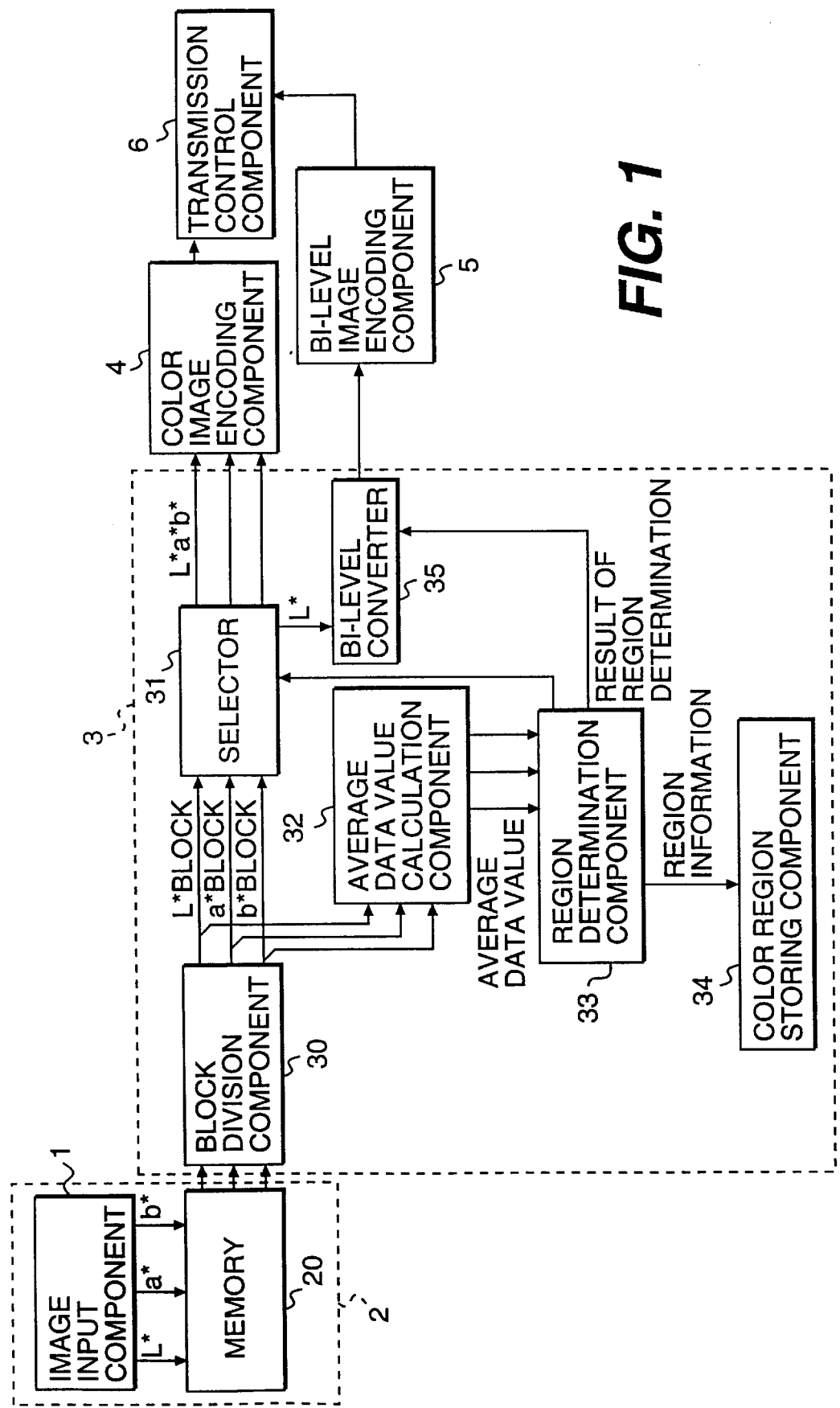
FIG. 1 shows a first embodiment of the image signal encoding apparatus according to the present invention.
Figure 13:
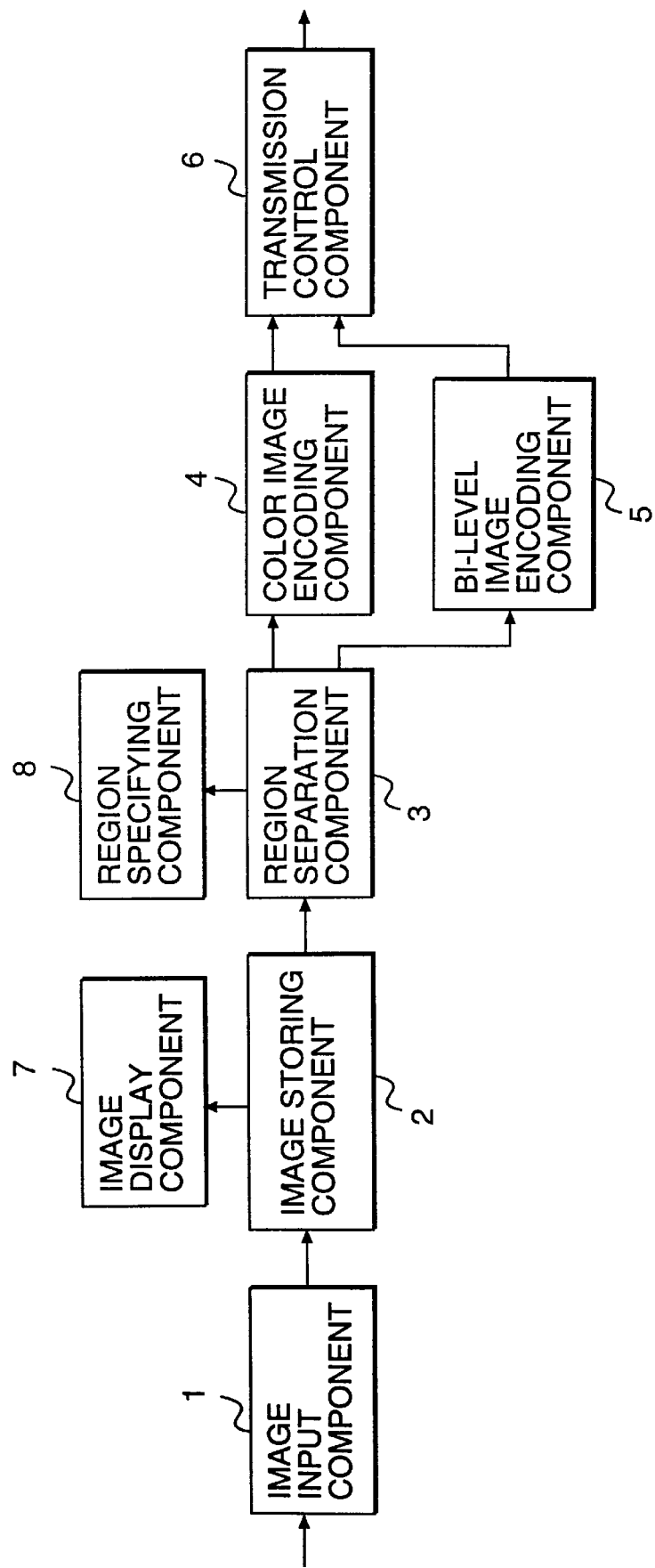
FIG. 13 shows a conventional art ending apparatus.

FIG. 1 is a block diagram showing the first embodiment of the image signal encoding apparatus according to the present invention. In the FIG. 1, constituents corresponding to constituents in FIG. 13 have the same reference numbers as those in FIG. 13.

First the construction of the embodiment is described based on FIG. 1.

In the FIG. 1 is an image input component for reading an image from an original, converting it into each color component and outputting image data for each color component, 20 is a memory for storing the image data, 30 is a block division component for dividing the image data of each color component into pixel blocks which are rectangular regions consisting of m×n pixels, wherein m and n are positive integers, 32 is an average data value calculation component for calculating the average data value of pixel block of each color component, 33 is a region determination component for determining to which region the block corresponds, color, monochrome or background, based on the average data value of the pixel block of each color component, 34 is a color region storing component for storing the color region determined by the result of the above determination, 31 is a selector for switching pixel blocks to be output and output destination corresponding to steps 1 or 2, 35 is a bi-level conversion component for switching bi-level conversion process of the pixel blocks depending on the determination result, 4 is a color image encoding component for encoding pixel blocks of the color region, 5 is a bi-level image encoding component for encoding pixel blocks converted by bi-level conversion, and 6 is a transmission control component for transmitting encoding result of every region with region information.

The operation of the image signal encoding apparatus is now described based on FIG. 1.

An image on an original to be encoded is read by the image input component 1 and converted into rectangular pixel blocks of substantially independent components including m×n pixels where m and n are positive integers, comprising lightness information and chromaticity information or luminance information and chrominance information. Therefore, monochrome regions of the original can be represented only by the lightness information.

As a color space consisting of lightness information and chromaticity information as described above, CIELAB (L*a*b* space) and CIELUV (L*u*v* space) prescribed by the Commission Internationale de l'Eclairage (CIE) are known. In both color spaces, L* represents lightness information and the other two represent chromaticity information.

Luminance information and chrominance information which are substantially independent can also be used. For example, in the field of television, black-and-white and color signals are made compatible by employing a color space consisting of luminance information and chrominance information such as YCbCr and YIQ, wherein Y represents the luminance information and Cb, Cr or I, Q represent the chrominance information. This is because, as with the lightness information previously described, monochrome information in an image can be represented by the luminance component alone.

The present invention will be explained taking L*a*b* space as an example. However, there is no intention to limit the color space to L*a*b*, and it is possible to employ other color spaces described above.

Image signals outDut from the image input component 1 are stored in the memory 20 for each color component. The image signal stored in the memory 20 is read out by the block division component 30 and divided into pixel blocks of lightness component and chromaticity components which are rectangular regions of m×n pixels.

The average value calculation component 32 calculates the average data value over the pixel block for each color component signal value and outputs the result. If the color component signal values in a block are represented by $L^*(i, j)$, $a^*(i, j)$, $b^*(i, j)$, the average data values over the block for each of color components, $\mu L^*$, $\mu a^*$ and $\mu b^*$ are expressed by the following respective formulas, wherein i and j represent the position of a pixel in the block.

$$\mu L^* = \frac{1}{m \times n} \sum_{i=0, j=0}^{m,n} L^*(i, j) \quad (1)$$

$$\mu a^* = \frac{1}{m \times n} \sum_{i=0, j=0}^{m,n} a^*(i, j)$$

$$\mu b^* = \frac{1}{m \times n} \sum_{i=0, j=0}^{m,n} b^*(i, j)$$

The region determination component 33 determines to which region each pixel block corresponds, color, monochrome, or background, based on the average data value over the pixel block for each color component.

Figure 4:
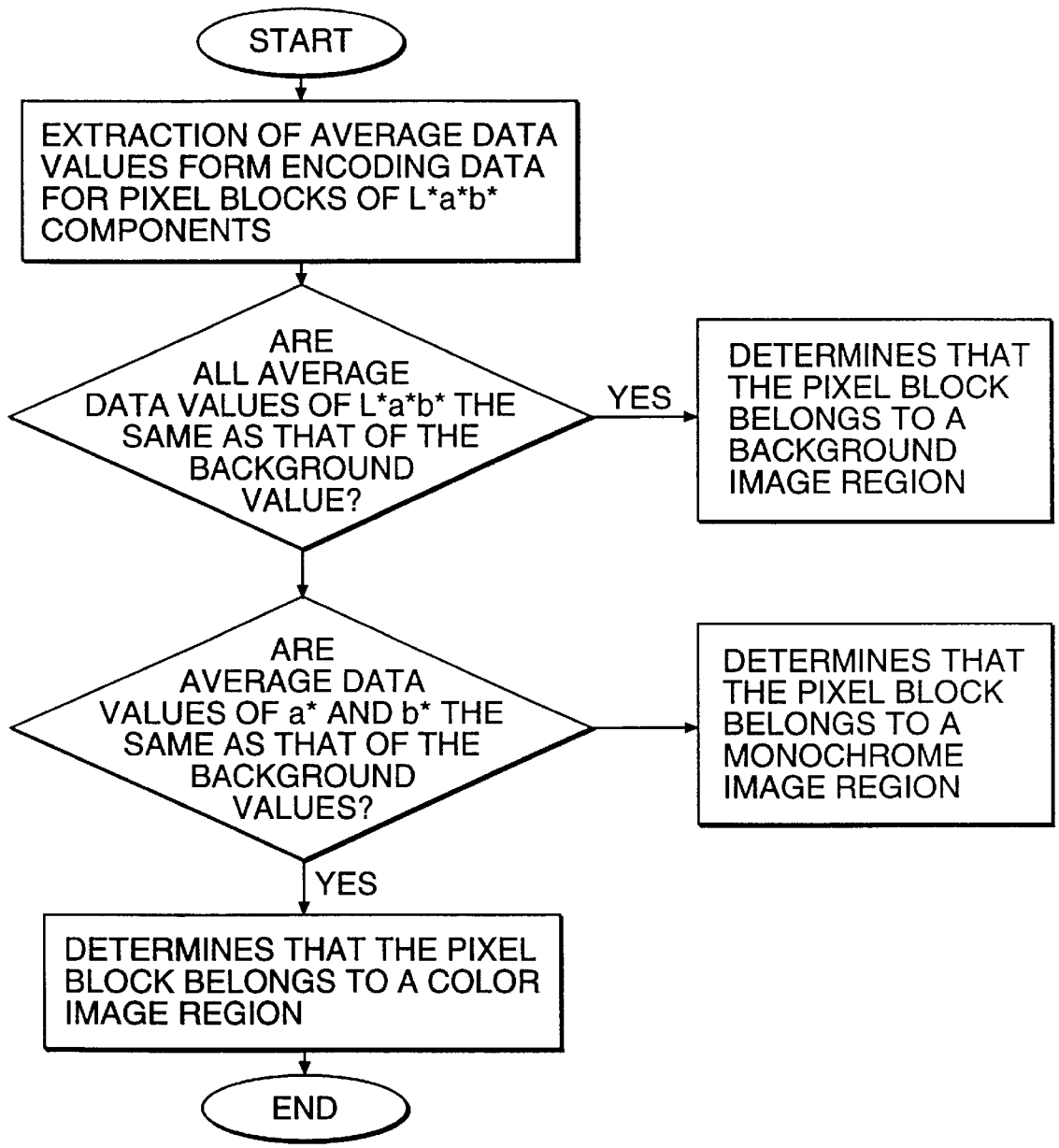
FIG. 4 is a flow chart showing a block region determination process.

The procedure for region determination is shown in FIG. 4.

First it is determined whether the average value of each color component in a pixel block is identical with that of the background value. This procedure is carried out by determining whether the difference between the L*a*b* value of a region in an original where nothing is printed, namely, a blank region, and the average value of L*a*b* in the pixel block is within a certain range. If the background is all in black, the same process is carried out to determine whether a region is the black background region.

If the values L*, a* and b* of the blank portion are represented by WL*, Wa* and Wb*, respectively, the blank portion is determined to be the background portion, when $\mu L^*$, $\mu a^*$ and $\mu b^*$ satisfy the following respective formulas:

$|\mu L^* - WL^*| \leq EL^*$ $|\mu a^* - Wa^*| \leq Ea^*$ $|\mu b^* - Wb^*| \leq Eb^* \quad (2)$ wherein EL*, Ea* and Eb* are threshold levels which have been predetermined corresponding to the type of paper to be used. In the case of solid black background, the determination can be carried out by the same process. The background reckon can be separated through the above procedure.

The determination method of the monochrome region is now described. It is determined whether the average data value for L* over a pixel block having been determined not to correspond to the background region is different from tnha of the background color or not.

Specifically, a region satisfying the following formulas is determined to correspond to the monochrome image region:

$|\mu L^* - WL^*| > EL^*$ $|\mu a^* - Wa^*| \leq Ea^*$ $|\mu b^* - Wb^*| \leq Eb^* \quad (3)$ As a result of the above determination, a block determined to be neither background region nor monochrome region is regarded as corresponding to the color image region. At this time, the projection profile of detected pixel blocks of the color region is calculated by the region determination component 33.

Figure 5:
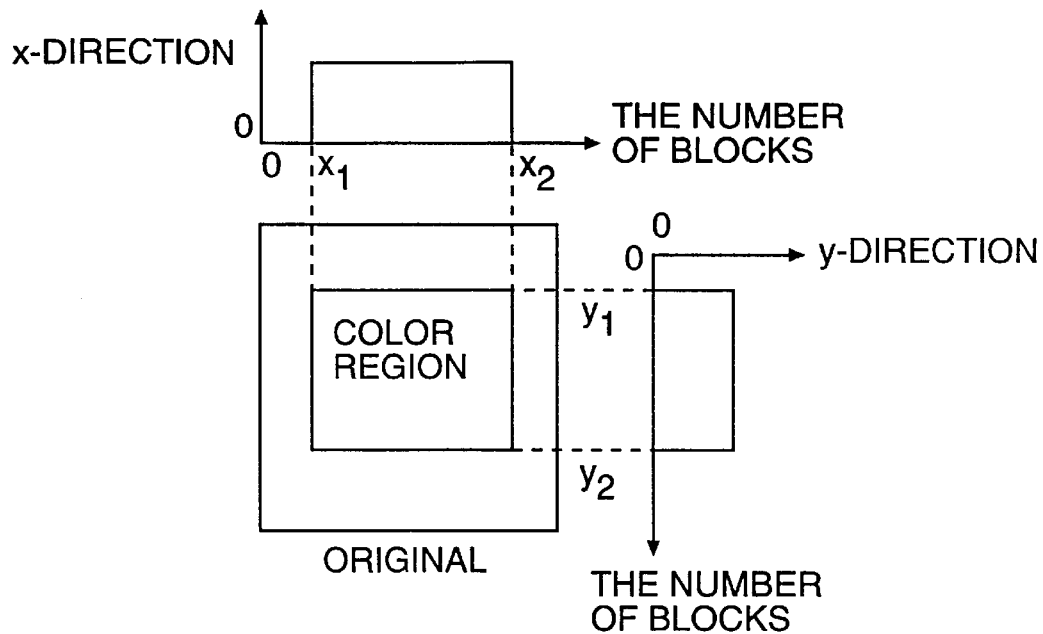
FIG. 5 shows the projection profile of a color region.

FIG. 5 shows a method of calculating the projection profile.

The region determination component 33 has counting areas corresponding to the number of blocks in both horizontal (x) and vertical (y) directions of the original, and on every determination of a pixel block to correspond to the color region, increments the count which corresponds to the position in column and row directions.

The region corresponding to the color image is now determined based on the count values when the determination process for all blocks is completed. In the example in FIG. 5, the starting coordinates of the color region corresponds to the block position (x1, y1) where the count changes from zero to a positive value, and the block position (x2, y2) where the count returns to zero can be regarded as the finishing coordinates of the color region. The information about the determined color region is stored in the color region storing component 34.

By general determination of the color image region using the projection profile, local determination errors can be avoided.

The region determination component 33 switches the selector 31 so that only the L* values of a pixel block are output to the bi-level conversion component 35 during step 1 described above, that is, during the processes of region determination and bi-level encoding of an image on an original. In step 2, the region determination component 33 switches the selector 31 so that the L*a*b* values of the pixel block in the region having been stored in the color region storing component 34 are output to the color image encoding component 4.

The bi-level conversion component 35 switches the bi-level conversion process for input L* value of a block based on the result of region determination by the region determination component 33.

The bi-level conversion process corresponding to the result of region determination is now described based on FIG. 6. The size of a block is supposed to be 8×8 pixels, and in the bi-level conversion, 0 represents white and 1 represents black.

Figure 7:
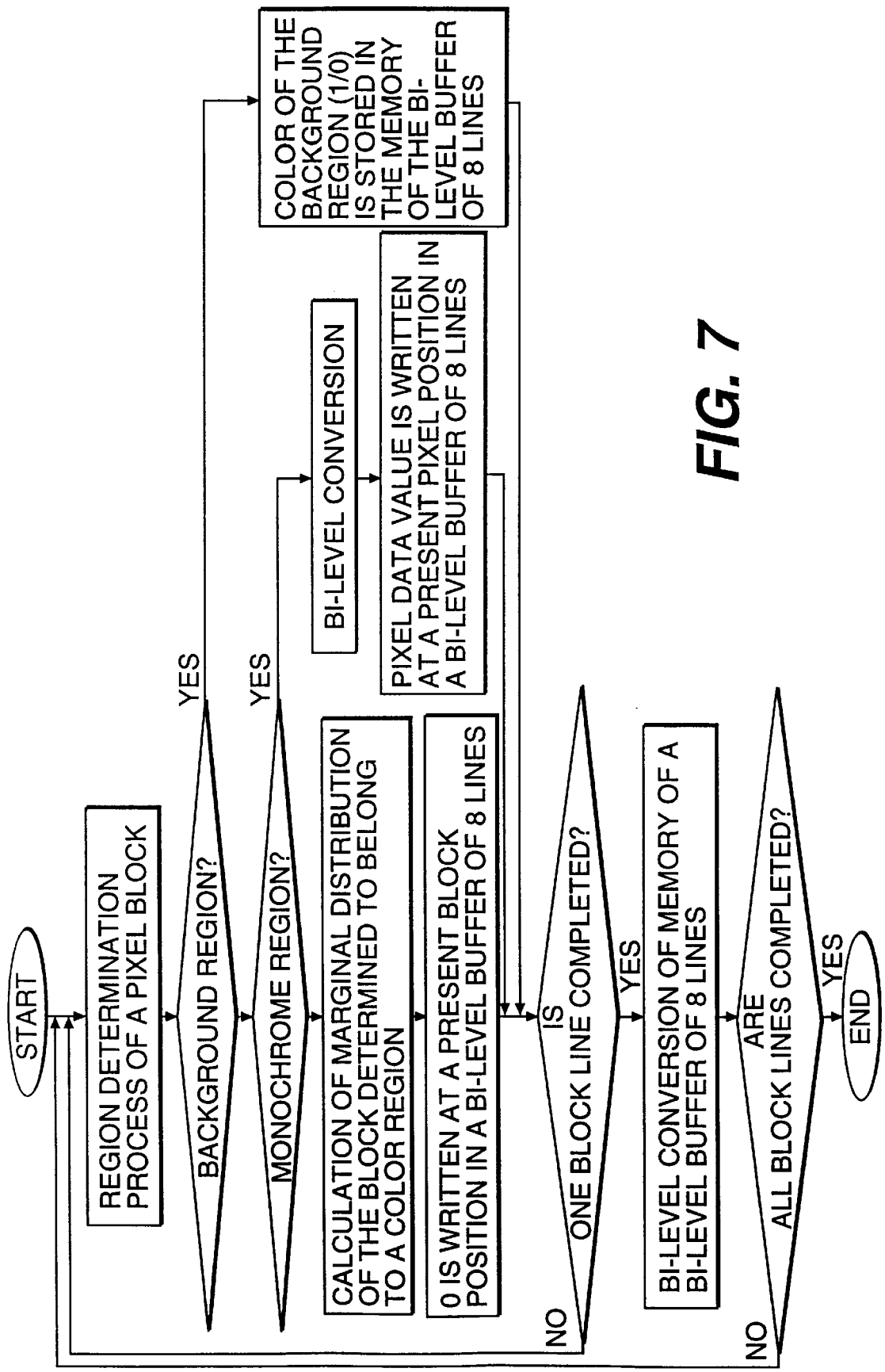
FIG. 7 shows the processes of region determination and bi-level encoding.

As shown in FIG. 6(a), if a block is determined to correspond to the background region, that is, the white ground of the original, or is determined to be a solid black region by the region determination process, the whole of the block is converted to a bi-level value of 0 or 1. As shown in FIG. 6(b), if a block is determined to be a monochrome region, the bi-level conversion process is carried out. If the block is determined to be a color region as shown in FIG. 6(c), whole block is converted by bi-level conversion so that the block is all 0. FIG. 7 is a flow chart of the above-described processes.

The pixel blocks having passed through the bi-level conversion process, are encoded by the bi-level image encoding component 5. In the case where the block size is 8×8 pixels, by temporarily storing them in a bi-level buffer of 8 lines or more, the pixel blocks can be encoded by a sequential scan line method such as an encoding method for a conventional facsimile apparatus.

Figure 2:
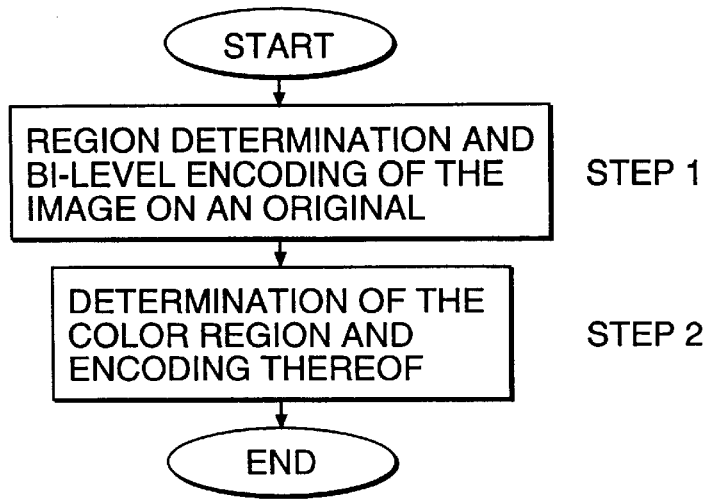
FIG. 2 is a flow chart showing a process of encoding an image on an original including a combination of color image regions and monochrome image regions.

If it is known in advance that the transmission destination of the code has a capability of decoding only bi-level images, or the original has no color region, the encoding operation can terminate with step 1 in FIG. 2. In this case, color region determination is invalidated and bi-level conversion and encoding of the lightness component of the whole original is carried out.

In step 2, the region determination component 33 controls the selector 31 so that only the pixel blocks in the color region are transmitted according to the color region information stored in the color region storing component 34 which is shown in FIG. 1. L*a*b* values of the pixel block output by the selector 31 are encoded by the color image encoding component 4. As an encoding algorithm, JPEG, an international standard method of encoding the static image is known for example, but it is not intended to limit the algorithm to JPEG in the present invention.

If it is known beforehand that the transmission destination of the code has a capability of decoding only color images, or the whole original is the color region, step 1 in FIG. 2 can be omitted and the encoding operation can be terminate with step 2 only.

In FIG. 1, the transmission control component 6 transmits the code data which has been encoded by the color image encoding component 4 or the bi-level image encoding component 5 with the region information.

Furthermore, the image storing component 2 in FIG. 1 can be omitted by scanning the original twice, where step 1 in FIG. 2 is carried out during the first scan and step 2 is carried out during the second scan.

Second Embodiment

Figure 8:
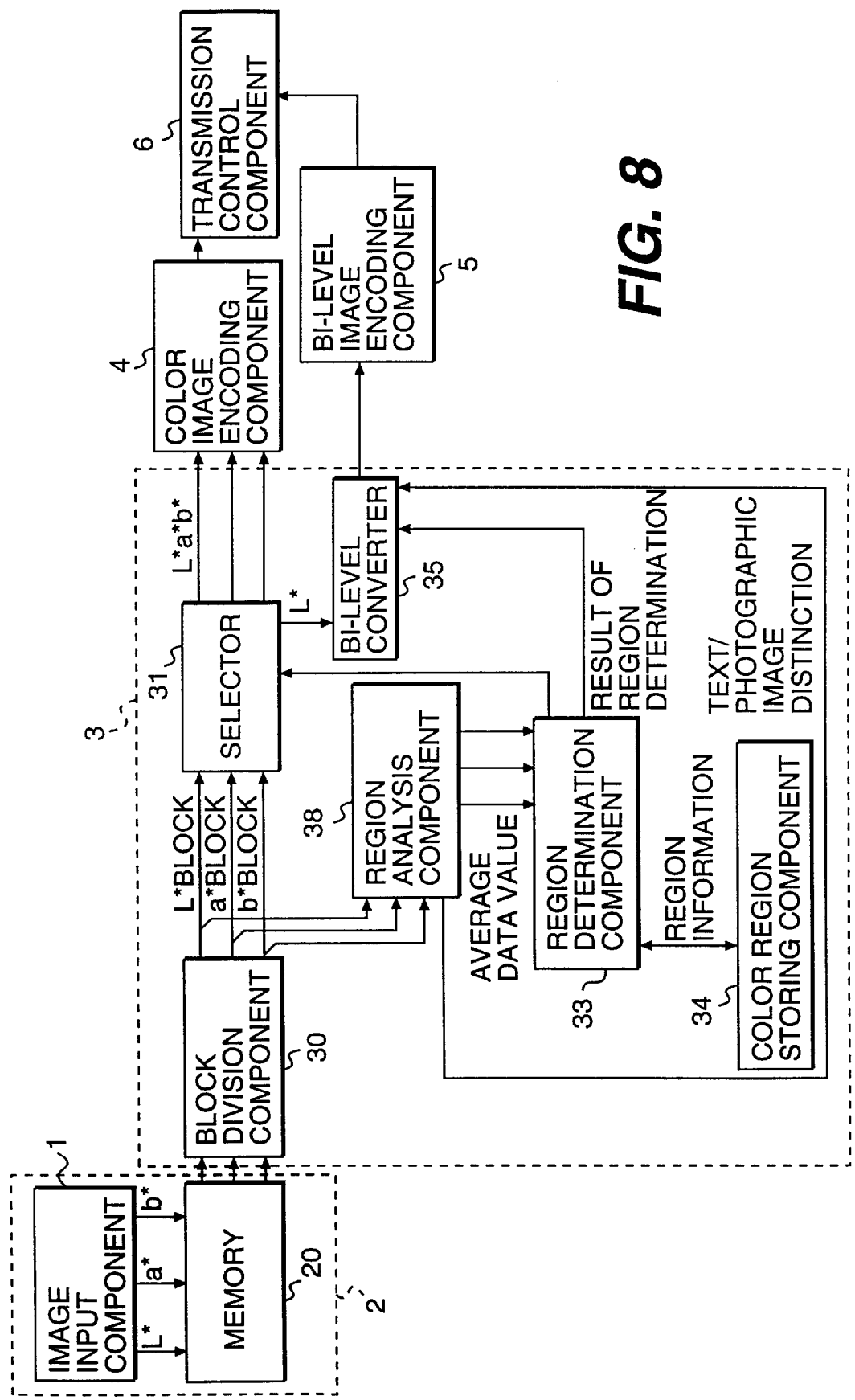
FIG. 8 shows a second embodiment of the image signal encoding apparatus according to the present invention.

FIG. 8 is a block diagram showing a second embodiment of the image encoding apparatus according to the present invention. In FIG. 8, constituents corresponding to constituents in FIG. 1 or 13 have the same reference numbers as those in FIG. 1 or 13, and explanation for those constituents are omitted.

In FIG. 8, 38 is a region analysis component for calculating an average data value of the signal values in a pixel block and analyzing whether the block is a text or photographic image based on statistics in the block. The output average data value, the same as that of the first embodiment, is input to the region determination component 33. The determination result distinguishing between text and photographic image is transmitted to the bi-level conversion component 35.

The method of operation is as follows.

The inventors of the present invention has filed an application for an invention related to region analysis process in the region analysis component 38, as Japanese Patent Application No. Hei. 4-302628 (1992). A region analyzing apparatus disclosed in this application first generates an average data value separation block by subtracting the average data value of each pixel block input, measures the variance, histogram values, and maximum and minimum values of the average separation block, and analyzes whether the pixel distribution in the pixel block corresponds to text or a photographic image based on the relationship among the statistics of the block. As a result of the analysis, the region analyzing component 38 outputs the average data value and information distinguishing between text and photographic image.

As in the first embodiment, the region determination component 33 carries out region determination based on the information on the average data value over the pixel block for each color component.

The bi-level conversion component 35 appropriately carries out bi-level conversion of the blocks based on the region determination by the region determination component 33 and the text and photographic image distinction by the region analyzing component 38. In the first embodiment, the bi-level conversion is simply carried out for a block determined to be a monochrome image region as shown in FIG. 6(b). However, in the second embodiment, the blocks of the monochrome image region are further classified based on the text and photographic image distinction. If the blocks correspond to the text region, simple bi-level conversion is applied to them, and if the blocks correspond to the photographic image region, a halftoning technique such as error diffusion or dither is employed. In this way, an image can be reproduced with high quality even if the original includes monochrome photographs.

Figure 10:
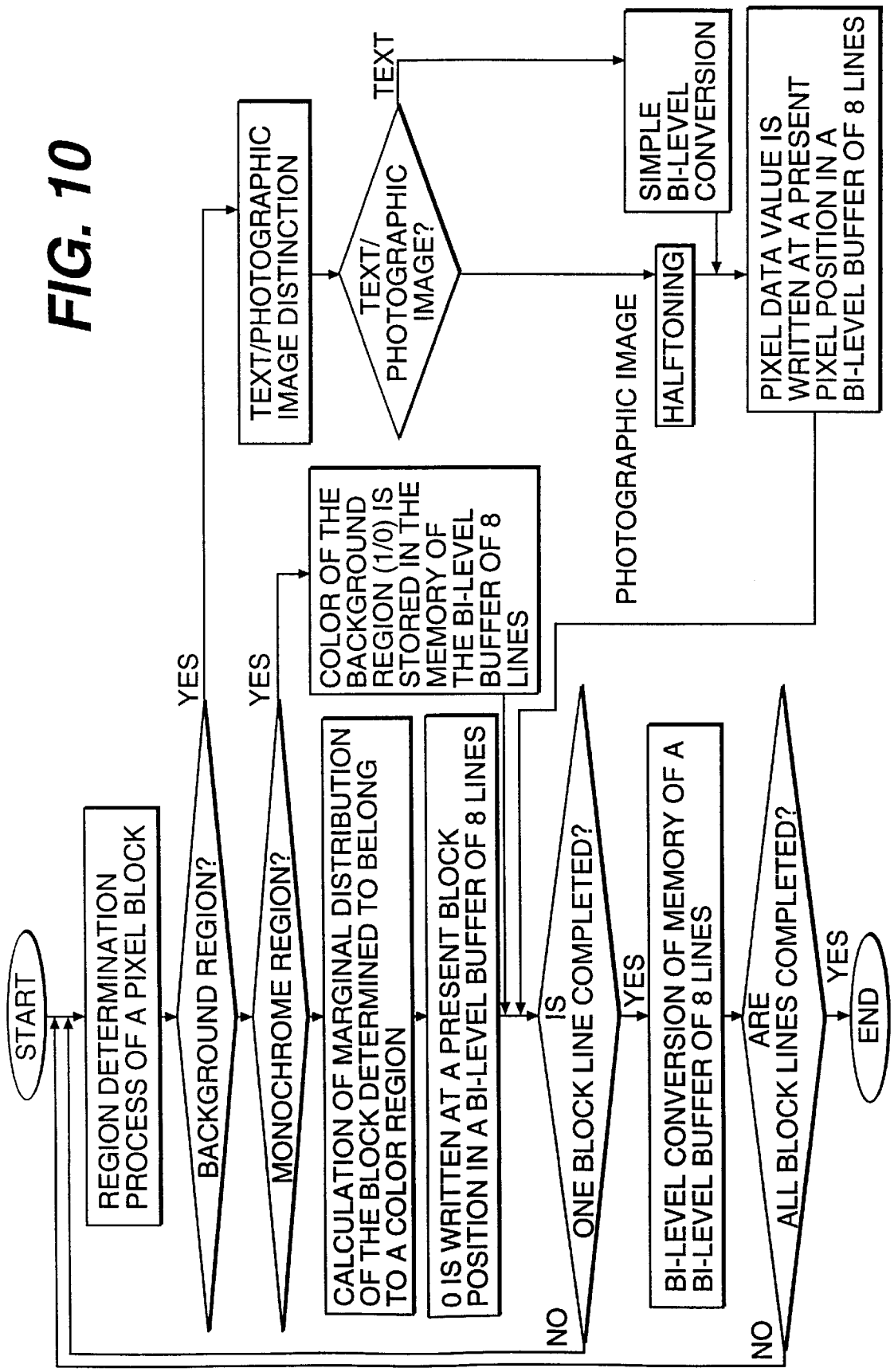
FIG. 10 shows processes of region determination and bi-level encoding in the second embodiment.

FIG. 10 is a flow chart showing the process of region determination and bi-level conversion in the second embodiment.

In the above description, a pixel block determined to be a photographic image in the monochrome region is regarded as a bi-level region, but it is also possible to regard it as a color region, and apply the color image encoding method.

In FIG. 8, if a pixel block is determined to be a photographic image by region determination, its projection profile is calculated by the region determination component 33, as in the case where the pixel block is determined to be a color region. In the color image encoding, a color component encoding method, separately encoding each color component, is generally employed. In the case of the monochrome photographic region, only the lightness component is required to be encoded supposing that the chromaticity components have no signal. For example, the JPG method is excellent for the reproduction of halftone images, thus improving the reproduction quality of monochrome photographic regions.

Third Embodiment

Figure 12:
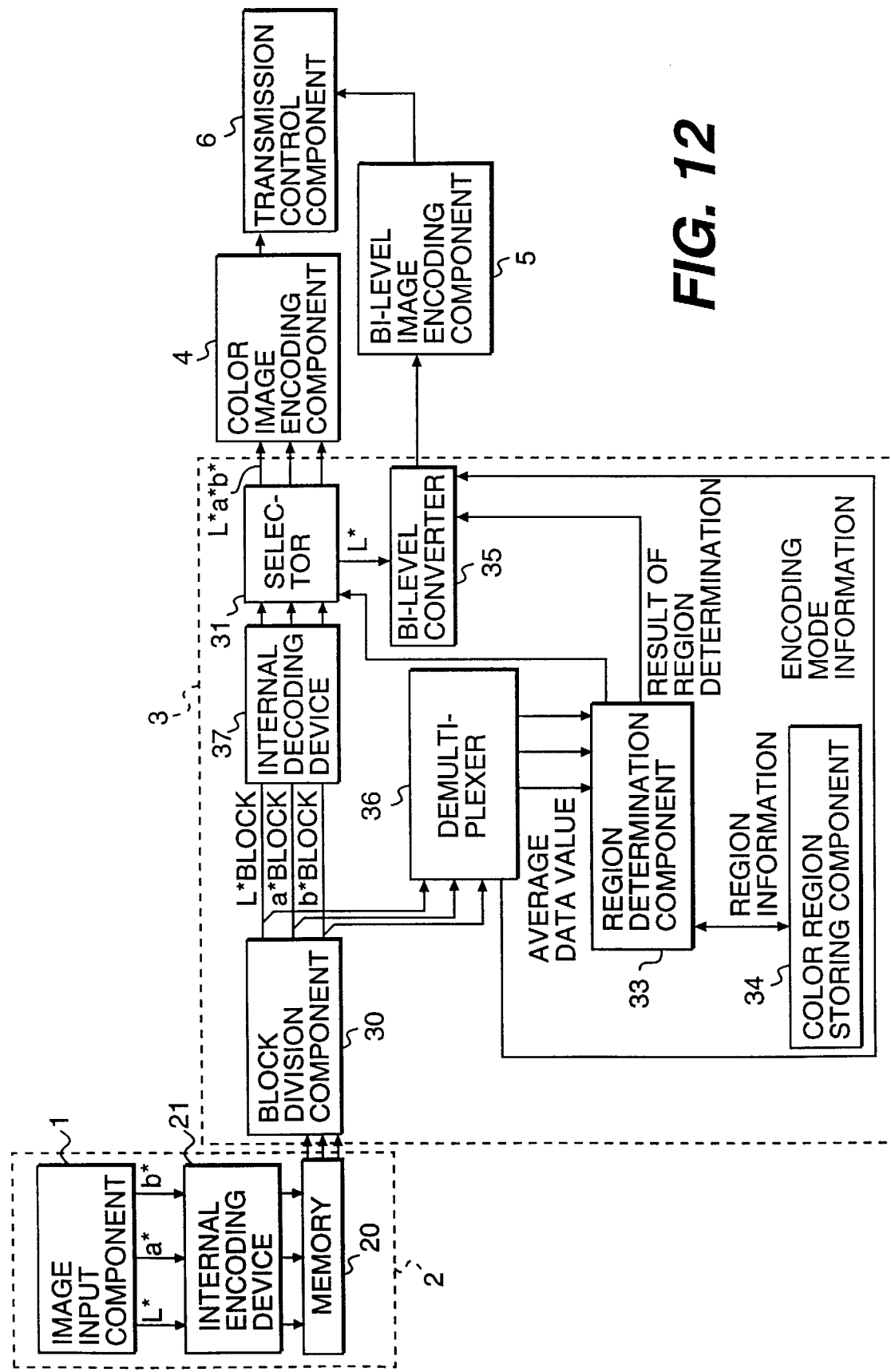
FIG. 12 shows a third embodiment of the image signal encoding apparatus according to the present invention.

FIG. 12 is a block diagram showing a third embodiment of the image encoding apparatus according to the present invention. The construction is described first, but constituents corresponding to constituents in FIG. 1, 8 or 13 have the same reference numbers as those in FIG. 1, 8 or 13, and explanation is omitted.

In FIG. 12, 21 is an internal encoding device for encoding an image signal, 37 is an internal decoding device for decoding the code data having been encoded by the internal encoding device 21, and 36 is a demultiplexer for deriving the average data value information and encoding mode information from the code data having been encoded by the internal encoding device 21.

A patent application for the encoding/decoding process of image signal performed by the internal encoding device 21 and internal decoding device 37 was filed by the inventors of the present invention, and has been published as Japanese Patent Application Unexamined Publication No. Hei. 5-56282 (1993). This invention has been proposed for the purpose of reduction of the internal memory of an image processing system, and is an encoding method based on a block approximation encoding method.

The invention disclosed in the above publication first divides an image into pixel blocks, analyzes waveform characteristics of each pixel block, and in accordance with the result of the analysis, selects a single encoding mode from a plurality of encoding modes of different resolutions and halftone levels, thus encoding by a block approximation. Whichever code is selected, the amount of the code can be maintained constant, whereby it is possible to easily detect the code data corresponding to a specific pixel block in an image on an original.

Figure 11:
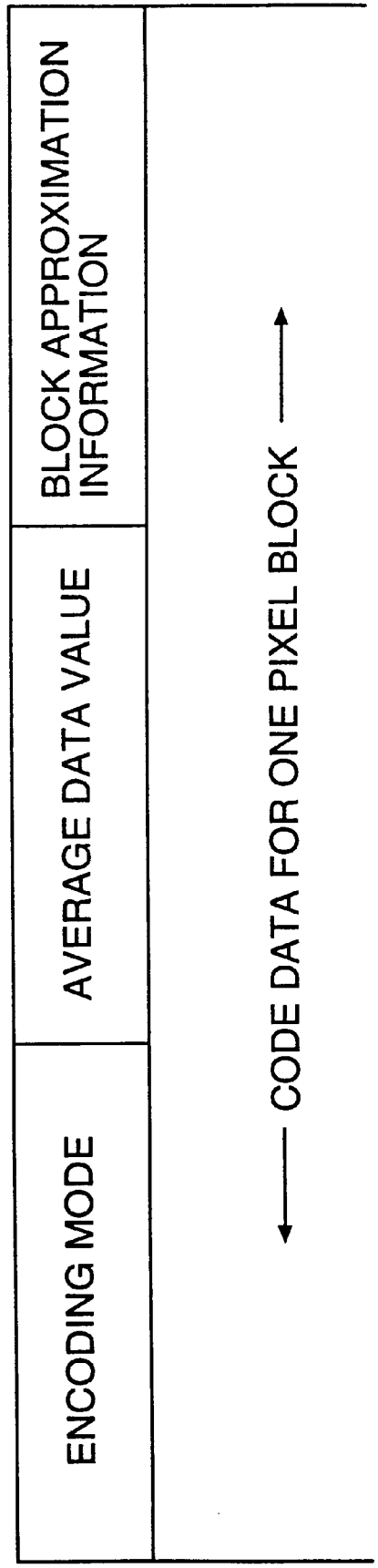
FIG. 11 shows a code data format generated by an internal encoding device.

FIG. 11 shows the construction of the code data in accordance with the internal encoding method. The code data consists of an encoding mode, an average data value over a pixel block and block approximation information as a result of the encoding by the block approximation.

In FIG. 12, the demultiplexer 36 separates the average data value information from the code data per pixel block unit and outputs it to the region determination component 33; therefore the region determination which is the same as that of the first embodiment can be carried out. Because the encoding mode information is determined based on a result of the analysis obtained by a region analysis method which is the same as that employed in the second embodiment, it can be used as an index for determining whether a pixel block corresponds to text or a photographic image.

In FIG. 12, the encoding mode information separated by the demultiplexer 36 is input to the bi-level conversion component 35. If a pixel block is a monochrome region, the text and photographic image distinction is carried out based on the encoding mode information, whereby an adaptive bi-level conversion process is performed and same effect as the second embodiment is provided.

As will be clear from the above description, according to the present invention, an image signal having been input is divided into color components consisting of lightness and chromaticity components or luminance and chrominance components, an average data value over a pixel block for each color component is determined, it is determined whether the pixel block corresponds to a background portion, monochrome region or color region, and then an overall determination of the color region of an original image is made based on he projection profile of the pixel blocks determined to be he color region by the previous determination, which makes it possible to avoid local determination errors and omit the manual correction of errors as required in the conventional example.

In the present invention, it is also possible to carry out scanning of the original twice and perform the processes of the detection of the color region (step 1) and he encoding of the color region (step 2) during first and second scanning processes, respectively, whereby the image storing means can be omitted.

Another effect of the present invention is to provide a reproduced image of high quality even if the original document includes monochrome photographic images by further determination whether a block having been determined to be a monochrome region is text or photographic image and carrying out the adaptive bi-level conversion process.

Another effect of the present invention is the capability of reducing the capacity of the memory by application of the internal encoding in temporary storage of the input image. Moreover, since the average value information of encoded pixel block is available from the internal encoding data, it is unnecessary to recalculate the average value over the pixel block decoded internally. In accordance with the present invention, the image quality of the monochrome region can also be improved because adaptive bi-level conversion process for monochrome region is applied using the encoding mode information determined by the result of the analysis of the waveform of the block having been internally encoded.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image signal encoding apparatus, comprising:

image inputting means for reading an image from an original and converting said image into data values comprising a plurality of color components including lightness and chromaticity components and outputting said data values;

storing means for storing each of said data values;

dividing means for dividing said data values into data values of a rectangular pixel block of lightness component consisting of m×n pixels and data values of rectangular pixel blocks of chromaticity components consisting of m×n pixels, where m and n are positive integers;

image analysis means for generating an average data value separation block by calculating an average lightness component data value of m×n pixels in said pixel block of lightness component and average chromaticity component data values of m×n pixels in said pixel blocks of chromaticity components and obtaining the difference between said average lightness component data value and said average chromaticity component data values for performing waveform analysis in said pixel blocks based on a plurality of statistics of said average data value separation block including variance, histogram values and maximum and minimum values and for outputting waveform information and said average data values of m×n pixels of said pixel blocks of lightness component and chromaticity components;

region determination means for determining whether said rectangular pixel block correspond to a color, monochrome, or background region in the original based on said average data values of m×n pixels of said pixel blocks of lightness component and chromaticity components and outputting a result of region determination;

switching means for outputting said data values of said pixel block of lightness component during the region determination process by said region determination means, and for outputting said data values of said pixel blocks of lightness component and chromaticity components after the region determination process is completed;

bi-level converting means for performing adaptive bi-level conversion of said data values of said pixel block of lightness component based on the result of said region determination and said waveform information;

bi-level image encoding means for encoding data values of said pixel block of lightness component converted by adaptive bi-level conversion;

region storing means for storing the result of said region determination as region information;

color image encoding means for encoding said data values of the rectangular pixel blocks of chromaticity components consisting of m×n pixels determined to correspond to the color region by said region determination means based on said region information stored in said region storing means after said region determination process on the whole original is completed; and transmission control means for transmitting at least one of said data values encoded by said bi-level image encoding means and said data values encoded by said color image encoding means.

2. The image signal encoding apparatus according to claim 1, wherein said plurality of color components including said lightness and chromaticity components are selected from a group comprising:
L*a*b* and L*u*v*.

3. The image signal encoding apparatus according to claim 1, wherein said region determination means determines that said pixel block corresponds to the background region when both of the difference between said average data value of said pixel block of lightness component and a predetermined background signal value of the original and the difference between said average data values of said pixel blocks of chromaticity components and said predetermined background signal value are not more than a predetermined threshold level, determines that said pixel block corresponds to the monochrome region when the differences between the average data values of said pixel blocks of chromaticity components and said predetermined background signal value are not more than said predetermined threshold level and the difference between the average data value of said pixel block of lightness component and said predetermined background signal value is more than said predetermined threshold level, and determines that said pixel block corresponds to the color region in all other cases.

4. The image signal encoding apparatus according to claim 1, wherein said region determination means includes means for calculating projection profile of said pixel block determined to correspond to the color region in the original to determine a position of the color region in the original.

5. An image signal encoding apparatus, comprising:

image inputting means for reading an image from an original and converting said image into data values comprising a plurality of color components including lightness and chromaticity components and outputting said data values;

internal encoding means for dividing said data values into data values of a pixel block of lightness component and data values of pixel blocks of chromaticity components, and for each of said pixel blocks of lightness component and chromaticity components, determining an encoding mode based on waveform characteristics of said pixel block, calculating an average data value of said pixel block, and converting encoding mode information indicating said determined encoding mode, said average data value of said pixel block and waveform approximation information indicating said waveform characteristics of said pixel block to internally encoded data of a fixed length;

storing means for storing said internally encoded data for each of said pixel blocks of lightness component and chromaticity component;

separation means for separating said average data value of said pixel block and said encoding mode information from said internally encoded data for each of said pixel blocks of lightness component and chromaticity components;

internal decoding means for decoding said internally encoded data for each of said pixel blocks of lightness component and chromaticity components stored in said storing means;

region determination means for determining whether said pixel blocks correspond to a color, monochrome or background region in the original based on said average data values of said pixel blocks of lightness component and chromaticity components, and outputting a result of region determination;

switching means for outputting said data values of said pixel block of lightness component during the region determination process by said region determination means, and for outputting said data values of said pixel blocks of lightness component and chromaticity components corresponding to each determined region after the region determination process is completed;

bi-level converting means for performing adaptive bi-level conversion of said data values of said pixel block of lightness component based on the result of said region determination and said encoding mode information;

bi-level image encoding means for encoding data values of said pixel block of lightness component converted by adaptive bi-level conversion;

region storing means for storing the result of said region determination as region information;

color image encoding means for encoding said data values of the pixel blocks of chromaticity components determined to correspond to the color region by said region determination means based on said region information stored in said region storing means after said region determination process on the whole original is completed; and transmission control means for transmitting at least one of said data values encoded by said bi-level image encoding means and said data values encoded by said color image encoding means.

6. The image signal encoding apparatus according to claim 5, wherein said plurality of color components including said lightness and chromaticity components are selected from a group comprising:
L*a*b* and L*u*v*.

7. The image signal encoding apparatus according to claim 5, wherein said region determination means determines that said pixel block corresponds to the background region when both of the difference between said average data value of said pixel block of lightness component and a predetermined background signal value of the original and the difference between said average data values of said pixel blocks of chromaticity components and said predetermined background signal value are not more than a predetermined threshold level, determines that said pixel block corresponds to the monochrome region when the differences between the average data values of said pixel blocks of chromaticity components and said predetermined background signal value are not more than said predetermined threshold level and the difference between said average data value of said pixel block of lightness component and said predetermined background signal value is more than said predetermined threshold level, and determines that said pixel block corresponds to the color region in all other cases.

8. The image signal encoding apparatus according to claim 5, wherein said region determination means includes means for calculating projection profile of said pixel block determined to correspond to the color region in the original to determine a position of the color region in the original.

9. An image signal encoding apparatus, comprising:

image inputting means for reading an image from an original and converting said image into data values comprising a plurality of color components including luminance and chrominance components and outputting said data values;

storing means for storing each of said data values;

dividing means for dividing said data values into data values of a rectangular pixel block of luminance component consisting of m×n pixels and data values of rectangular pixel blocks of chrominance components consisting of m×n pixels, where m and n are positive integers;

image analysis means for generating an average data value separation block by calculating an average luminance component data value of m×n pixels in said pixel block of luminance component and average chrominance component data values of m×n pixels in said pixel blocks of chrominance components and obtaining the difference between said average luminance component data value and said average chrominance component data values for performing waveform analysis in said pixel blocks based on a plurality of statistics of said average data value separation block including variance, histogram values and maximum and minimum values and or outputting waveform information and said average data values of m×n pixels of said pixel blocks of luminance component and chrominance components;

region determination means for determining whether said rectangular pixel blocks correspond to a color, monochrome, or background region in the original based on said average data values of m×n pixels of said pixel blocks of luminance component and chrominance components and outputting a result of said region determination;

switching means for outputting said data values of said pixel block of luminance component during the region determination process by said region determination means, and for outputting said data values of said pixel blocks of luminance component and chrominance components after the region determination process is completed;

bi-level converting means for performing adaptive bi-level conversion of said data values of said pixel block of luminance component based on the result of said region determination and said waveform information;

bi-level image encoding means for encoding data values of said pixel block of luminance component converted by adaptive bi-level conversion;

region storing means for storing the result of said region determination as region information;

color image encoding means for encoding said data values of the rectangular pixel blocks of chrominance components consisting of m×n pixels determined to correspond to the color region by said region determination means based on said region information stored in said region storing means after said region determination process on the whole original is completed; and transmission control means for transmitting at least one of said data values encoded by said bi-level image encoding means and said data values encoded by said color image encoding means.

10. The image signal encoding apparatus according to claim 9, wherein said plurality of color components including said luminance and chrominance components are selected from a group comprising:

YCbCr and YIQ.

11. The image signal encoding apparatus according to claim 9, wherein said region determination means determines that said pixel block corresponds to the background region when both of the difference between said average data value of said pixel block of luminance component and a predetermined background signal value of the original and the differences between said average data values of said pixel blocks of chrominance components and said predetermined background signal value are not more than a predetermined threshold level, determines that said pixel block corresponds to the monochrome region when the differences between said average data values of said pixel blocks of chrominance components and said predetermined background signal value are not more than said predetermined threshold level and the difference between the average data value of said pixel block of luminance component and said predetermined background signal value is more than said predetermined threshold level, and determines that said pixel block corresponds to the color region in all other cases.

12. The image signal encoding apparatus according to claim 9, wherein said region determination means includes means for calculating projection profile of said pixel block determined to correspond to the color region in the original to determine a position of the color region in the original.

13. An image signal encoding apparatus, comprising:

image inputting means for reading an image from an original and converting said image into data values comprising a plurality of color components including luminance and chrominance components and outputting said data values;

internal encoding means for dividing said data values of a pixel block into data values of a pixel block of luminance component and data values of pixel blocks of chrominance components, and for each of said pixel blocks of luminance component and chrominance components, determining an encoding mode based on waveform characteristics of said pixel block, calculating an average data value of said pixel block, and converting encoding mode information indicating said determined encoding mode, said average data value of said pixel block and waveform approximation information indicating said waveform characteristics of said pixel block to internally encoded data of a fixed length;

storing means for storing said internally encoded data for each of said pixel blocks of luminance component and chrominance components;

separation means for separating said average data value of said pixel block and said encoding mode information from said internally encoded data for each of said pixel blocks of luminance component and chrominance components;

internal decoding means for decoding said internally encoded data for each of said pixel blocks of luminance component and chrominance components stored in said storing means;

region determination means for determining whether said pixel blocks correspond to a color, monochrome or background region in the original based on said average data values of said pixel blocks of luminance component and chrominance components, outputting a result of region determination;

switching means for outputting said data values of said pixel block of luminance component during the region determination process by said region determination means, and for outputting said data values of said pixel blocks of luminance component and chrominance components corresponding to each determined region after the region determination process is completed;

bi-level converting means for performing adaptive bi-level conversion of said data values of said pixel block of luminance component based on the result of said region determination and said encoding mode information;

bi-level image encoding means for encoding data values of said pixel block of luminance component converted by adaptive bi-level conversion;

region storing means for storing the result of said region determination as region information;

color image encoding means for encoding said data values of the pixel blocks of chrominance components determined to correspond to the color region by said region determination means based on said region information stored in said region storing means after said region determination process on the whole original is completed; and transmission control means for transmitting at least one of said data values encoded by said bi-level image encoding means and data values encoded by said color image encoding means.

14. The image signal encoding apparatus according to claim 13, wherein said plurality of color components including said luminance and chrominance components are selected from a group comprising:
YCbCr and YIQ.

15. The image signal encoding apparatus according to claim 13, wherein said region determination means determines that said pixel block corresponds to the background region when both of the difference between said average data value of said pixel block of luminance component and a predetermined background signal value of the original and the differences between said average data values of said pixel blocks of chrominance components and said predetermined background signal value are not more than a predetermined threshold level, determines that said pixel block corresponds to the monochrome region when the differences between the average data values of said pixel blocks of chrominance components and said predetermined background signal value are not more than said predetermined threshold level and the difference between the average data value of said pixel block of luminance component and said predetermined background signal value is more than said predetermined threshold level, and determines that said pixel block corresponds to the color region in all other cases.

16. The image signal encoding apparatus according to claim 13, wherein said region determination means includes means for calculating projection profile of said pixel block determined to correspond to the color region in the original to determine a position of the color region in the original.

* * * * *